W. D. HARPER.
ALARM TRACK GAGE.
APPLICATION FILED APR. 26, 1920.

1,395,105.

Patented Oct. 25, 1921.
2 SHEETS—SHEET 1.

W. D. Harper INVENTOR
BY Victor J. Evans
ATTORNEY

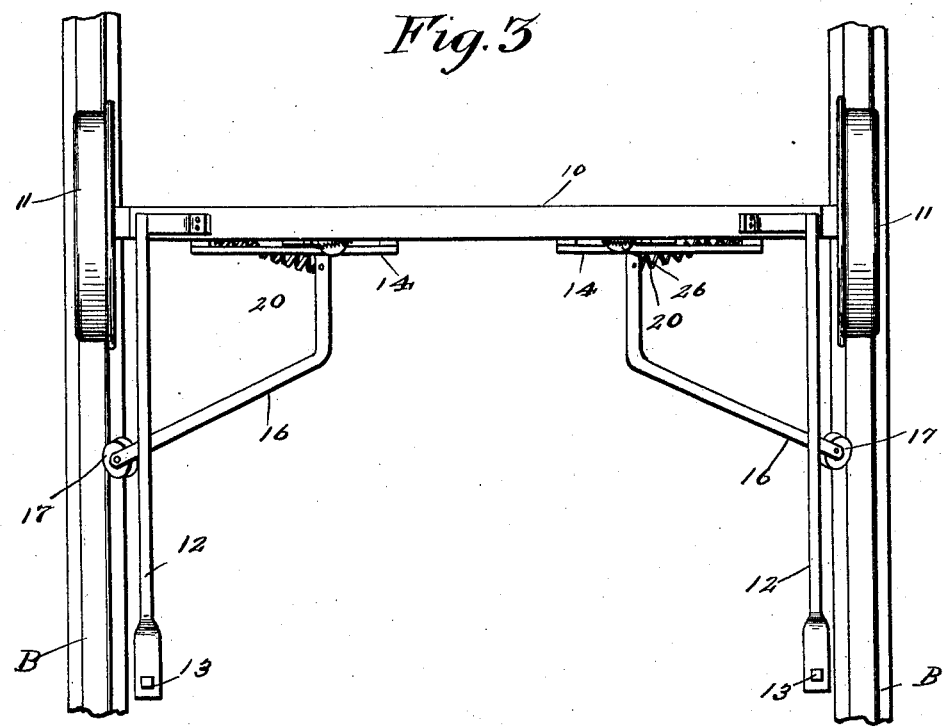
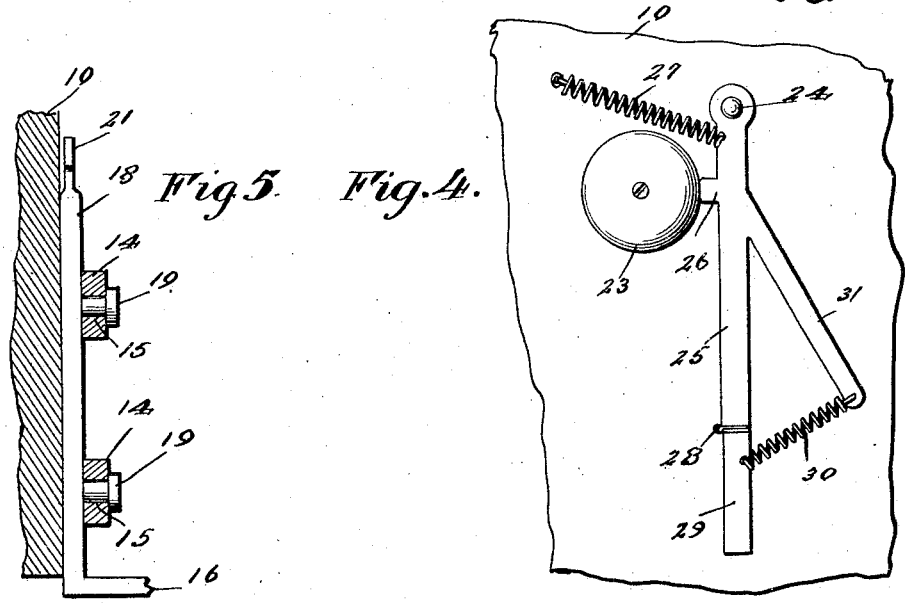

UNITED STATES PATENT OFFICE.

WILLIAM DAVID HARPER, OF SYDENHAM, ONTARIO, CANADA.

ALARM TRACK-GAGE.

1,395,105.                    Specification of Letters Patent.    Patented Oct. 25, 1921.

Application filed April 26, 1920. Serial No. 376,851.

*To all whom it may concern:*

Be it known that I, WILLIAM D. HARPER, a subject of the King of Great Britain, residing at Sydenham, in the Province of Ontario and Dominion of Canada, have invented new and useful Improvements in Alarm Track-Gages, of which the following is a specification.

This invention relates to railroad devices, and has for its object the provision of a device adapted to be connected with a hand car or other vehicle used by a track foreman or the like, this device being provided with movable arms carrying rollers engaging against the track rails, the arms having associated therewith pointers traveling over scales whereby in the event of spreading of the rails, the degree of spreading will be indicated on the scale, the device further including an alarm in the nature of a bell adapted to be rung by the indicator members in the event of a spread rail.

An important object is the provision of a device of this character which is complete in itself and which is provided with clamping means whereby it may be attached to a vehicle such as a track automobile, hand car, or the like.

Another object is the provision of a device of this character in which is provided a roller and arm associated with each track, each arm having the indicating mechanism associated therewith so that the condition of both sides of the track may be ascertained at the same time.

An additional object is the provision of a device of this character which will be comparatively simple and inexpensive in manufacture, highly efficient in use, durable in service, accurate, and a general improvement in the art.

With the above and other objects and advantages in view, the invention consists in the details of construction to be hereinafter more fully described and claimed, and illustrated in the accompanying drawings in which—

Figure 1:
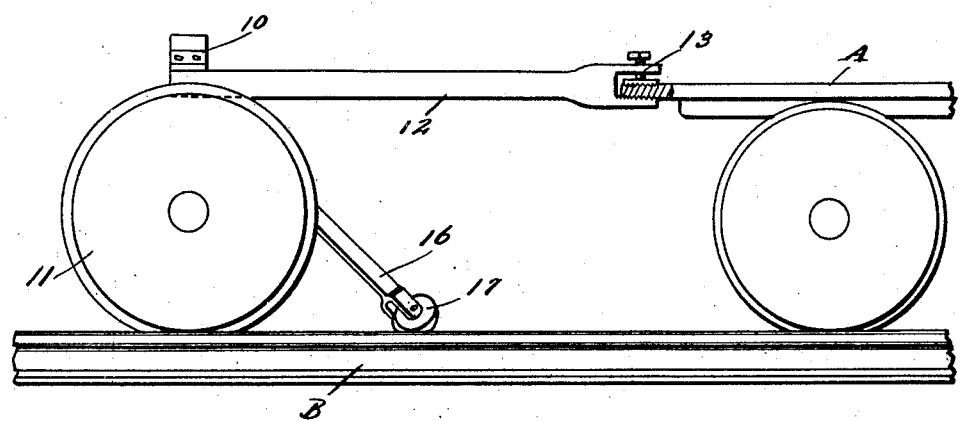
Figure 2:
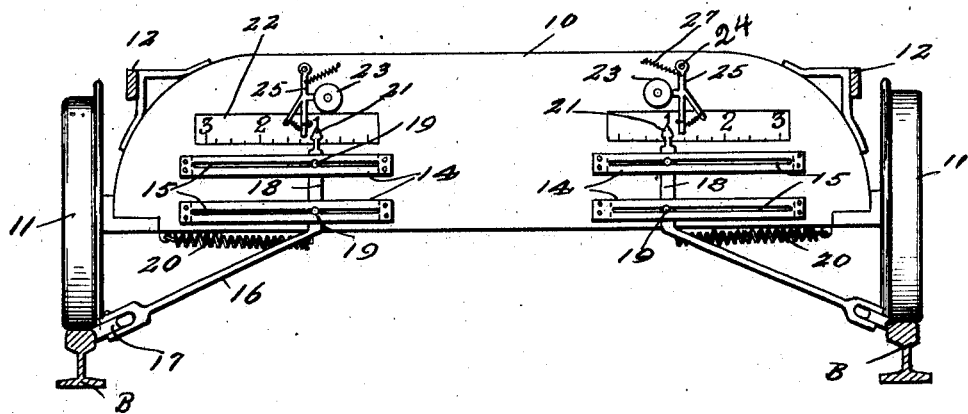

Figure 1 is a side elevation of my device showing it associated with a track automobile, Fig. 2 is an elevation of my device taken at right angles to Fig. 1, Fig. 3 is a plan view, Fig. 4 is an enlarged detail view of the bell operating means, Fig. 5 is a cross sectional view through the guide members.

Referring more particularly to the drawings, the letter A designates a portion of a track vehicle which might be a hand car or a track automobile such as is used by track foremen or other inspectors.

In carrying out my invention I provide a body member 10 of any suitable construction provided at its ends with wheels 11. The ends of the body 10 have connected therewith reach bars 12 which are provided with clamping members 13 engageable with some suitable portion of the vehicle A.

Secured upon the body 10 at one side thereof and at each end, are vertically spaced guides 14 provided with slots 15. Disposed at each end of the body is an arm 16 at the free end of which is journaled a grooved roller 17 engaging against the ball of the adjacent rail. Each arm 16 is inclined so as to trail behind the wheel 11 and is bent to provide a vertically extending portion 18 disposed between the body and the guides 14. Secured to the vertical portion 18 are bolts 19 disposed within the slots 15 and serving to guide the portion 18 in its movement. Each arm 16 has connected therewith a coil spring 20 which is rigidly secured to the body and the purpose of which is to hold the roller 17 firmly in engagement with the rail B. The upper end of each upright portion 18 is pointed to provide an indicator 21.

Secured upon each end portion of the body above the guides 14 is a scale 22 provided with suitable graduations adapted to indicate variations in the distance between the rails. The indicator or pointer 21 moves over this scale 22, depending upon the movement of the arm 16, as will be readily apparent.

Associated with each end of the body is an alarm device comprising a bell 23 adjacent which is pivoted, as at 24, an arm 25 having a projection 26 adapted to strike against the bell 23. A coil spring 27 is provided for normally urging the arm 25 toward the bell. Hinged upon the end of the arm 25 by a pull joint 28, is a member 29 connected by a spring 30 with a lateral extension 31 on the arm 25.

The operation of the device is as follows:

When the track rails are properly disposed and the track gage is correct, the arm 18 is at the inner end of the guides 14. During the passage of the device over the track if the track is spread the arm 16 associated with the rail will move outwardly under the influence of the spring 20. This outward movement of the arm will result in sliding movement of the upright portion 18 outwardly along the guides 14 and as this movement occurs the pointer 21 will engage the hinged end member 29 of the striking arm 25 and will swing it away from the bell 23 in opposition to the spring 27. As the movement of the pointer 21 continues it will pass under the hinged end portion 29 whereupon the arm 25 will be released and will be pulled by the spring 27 into engagement with the bell 23, thereby making an audible signal to attract the attention of the operator. When the track returns to its normal gage the arm 16 and consequently the upright portion 18, will be returned inwardly along the guides 14 whereupon the pointer 21 will engage the end portion 29 of the lever 25 and swing it idly upon the knee joint 28 so that the pointer may return to normal position inwardly of the arm 25. The structure being the same at both ends of the device, it will be seen that both rails may be tested simultaneously, the operation being the same, of course, at each end.

From the foregoing description and a study of the drawings it will be apparent that I have thus provided a very simple and efficient device for detecting variations in the gage of a track, the device being moreover provided with automatically operated alarm means to attract the attention of the operator in the event of spreading of the rails, the latter feature being important as it is well known that the inspector must notice all the track conditions such as the condition of the road bed and the like and cannot devote his entire energy to watching any indicating device.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a wheeled support adapted to travel upon a track, a pair of outwardly spring-pressed arms slidably mounted at the end portions of the support and carrying grooved rollers engaging against the ball of the adjacent rail, indicating members at the inner ends of said arms, each end portion of the support being provided with a graduated scale over which said indicating members travel, a bell associated with each indicating member, a pivoted spring-pressed striker arm located adjacent each bell and having an end portion hinged by a knee joint connection and disposed in the path of travel of said indicator.

2. A device of the character described comprising a body member provided at its ends with wheels traveling upon a track, guide members at each end of the body, an outwardly spring-pressed arm carried by each end of the body and carrying a grooved roller bearing against the ball of the adjacent rail, each arm including an upright portion constituting an indicator and slidably mounted within one set of said guides, said body member having a scale traveled over by the indicator, a bell located adjacent the inner end portions of the guides, means whereby upon movement of the indicator outwardly along the guides said bell will be struck.

3. A device of the character described comprising a body member carrying wheels and having means whereby it may be clamped to trail behind a track vehicle, vertically spaced slotted guide members secured upon one side of the body member at the end portions thereof, an outwardly spring-pressed arm located at each end of the body member and carrying a grooved roller bearing against the ball of the adjacent rail, each arm being bent to provide a vertical portion constituting an indicator slidable between said guides and the body member, bolts passing through the slots in the guide members and secured to said indicator members, said body member having a scale traveled over by each indicator member, a bell located at the inner end of each set of guide members, a spring-pressed arm pivoted adjacent each bell and adapted to strike thereagainst, and an end portion on each arm pivotally mounted by a knee joint and disposed in the path of travel of the indicator members.

In testimony whereof I affix my signature.

WILLIAM DAVID HARPER.